United States Patent [19]

Tanaka et al.

[11] Patent Number: 5,114,245
[45] Date of Patent: May 19, 1992

[54] DYNAMIC PRESSURE BEARING DEVICE

[75] Inventors: Katsuhiko Tanaka, Yamato; Takeyuki Yoshiba, Fujisawa; Takanobu Sato, Odawara; Ikunori Kawakami, Fujisawa; Koichi Kawakami, Yokohamashi, all of Japan

[73] Assignee: Nippon Seiko Kabushiki Kaisha, Tokyo, Japan

[21] Appl. No.: 551,549

[22] Filed: Jul. 11, 1990

[30] Foreign Application Priority Data

Jul. 17, 1989 [JP] Japan .................. 1-183989
Jan. 31, 1990 [JP] Japan .................. 2-21808

[51] Int. Cl.⁵ .............................. F16C 32/06
[52] U.S. Cl. ....................... 384/112; 384/107
[58] Field of Search ............ 384/100, 107–113, 384/120, 123, 121

[56] References Cited

U.S. PATENT DOCUMENTS

| | | | |
|---|---|---|---|
| 4,696,584 | 9/1987 | Tielemans | 384/107 |
| 4,798,476 | 1/1989 | Sakatani et al. | 384/108 |
| 4,805,972 | 2/1989 | Tanaka et al. | 384/107 X |
| 4,934,836 | 6/1990 | Tanaka et al. | 384/107 X |

FOREIGN PATENT DOCUMENTS 53-110746 9/1978 Japan .
57-89357 6/1982 Japan .
63-230218 9/1988 Japan .

Primary Examiner—Thomas R. Hannon
Attorney, Agent, or Firm—Basile and Hanlon

[57] ABSTRACT

A dynamic pressure bearing device includes a sleeve and a shaft member which is rotatably fitted into the sleeve. The sleeve is made of an aluminum alloy containing a carbon fiber and has a radial bearing surface formed in an inner peripheral surface and a thrust bearing surface formed in a lower end surface. The shaft member includes a base portion having a thrust receiving surface formed on an upper surface, and a shaft portion extending upright from the base portion and having a radial receiving surface formed on an outer peripheral surface. A first dynamic pressure generating groove is formed in at least one of the radial bearing surface and the radial receiving surface, and a second dynamic pressure generating groove is formed in at least one of the thrust bearing surface and the thrust receiving surface. The shaft member including the shaft portion and the base portion is molded from a synthetic resin as a unitary body. The thrust bearing surface is tapered so that a thrust bearing gap formed between the thrust bearing surface and the thrust receiving surface increases gradually, radially and outwardly.

6 Claims, 2 Drawing Sheets

DYNAMIC PRESSURE BEARING DEVICE

BACKGROUND OF THE INVENTION

1. Field of the Invention

The present invention relates to a dynamic pressure bearing device used in information equipment, acoustic equipment, video equipment, and the like.

2. Description of the Prior Art

As a prior art dynamic pressure bearing device, a structure disclosed, for example, in Japanese Patent Laid-Open Application No. 53-110746 has been known. This dynamic pressure bearing device is comprised of first and second members respectively having planes opposing each other. By forming a groove in the plane of the first member having a spiral shape for generating a dynamic pressure, air flows into the groove when the second member is rotated and a high pressure is generated so that the second member is rotated and a high pressure is generated so that the second member is rotated without contacting the first member. Furthermore, by forming a protruding portion in the form of a step of a minute size on the plane of the first member, the whole of both of the planes are prevented from directly contacting each other at the time of starting and stopping rotation.

However, the prior art dynamic pressure bearing device involves various problems as described below.

1) Although it is a dynamic pressure bearing device having a thrust bearing, a radial bearing is not included.

2) The protruding portion is in surface-contact with the plane of the second member, and thus, a large starting torque is required due to static friction existing therebetween. It also takes a long time to rise to a desired rotational speed.

3) On the other hand, sometimes, the second member is inclined with respect to the first member at the time of starting and stopping. As a result, a peripheral edge portion of the protruding portion is brought into contact with the plane of the second member and non-uniform contact tends to be caused resulting in large friction forces.

SUMMARY OF THE INVENTION

The present invention was made in view of the problems in the prior art, and it is an object of the invention to provide a dynamic pressure bearing device which is provided with a radial bearing portion and a thrust bearing portion, which requires small starting torque, and which enables a groove to be efficiently formed for generating a dynamic pressure for a thrust bearing. Another object of the invention is to provide a dynamic pressure bearing device which is low in manufacturing cost.

A dynamic pressure bearing device in accordance with the present invention comprises a sleeve having a cylindrical radial bearing surface formed in an inner peripheral surface and a thrust bearing surface at one end surface, a shaft member fitted into the sleeve and having a radial receiving surface opposing the radial bearing surface and having a thrust receiving surface opposing the thrust bearing surface, a first groove for generating a dynamic pressure formed in at least one of the radial bearing surface and the radial receiving surface, a second groove for generating a dynamic pressure formed in at least one of the thrust bearing surface and the thrust receiving surface, and a thrust bearing gap formed between the thrust bearing surface and the thrust receiving surface, the gap increasing gradually, radially and outwardly.

Furthermore, the sleeve may be formed from an aluminum alloy containing a carbon fiber.

The shaft member which is fitted into the sleeve may also include a base portion and a shaft portion extending integrally upright from the base portion.

In addition, the shaft member including the base portion and the shaft portion may be integrally formed with each other from a synthetic resin.

In the dynamic pressure bearing device, since the thrust bearing gap gradually increases radially and outwardly, the thrust bearing surface and the thrust receiving surface are in contact with each other at a lower inner peripheral edge of the sleeve. As a result, the contact area of the two surfaces becomes small, and static friction is also decreased Thus, a small starting torque is required, and the rise to a desired rotational speed is faster at the time of starting Furthermore, since the thrust bearing gap gradually increases radially and outwardly, even when one of the thrust bearing surface and the thrust receiving surface is inclined, the outer portion of the inclined surface will never contact the other surface.

Furthermore, in the dynamic pressure bearing device formed from an aluminum alloy containing a carbon fiber, the cutting work of the sleeve and the working form forming the dynamic pressure generating groove is easy. In addition, since the rotating portion becomes light in weight, the required starting torque is further reduced and the rise to a desired rotational speed at the time of starting becomes faster.

Furthermore, in the dynamic pressure bearing device in which the shaft portion and the base portion of the shaft member are integrally formed, the assembling process for the shaft member is not required, and the overall assembling cost is low. In particular, when the shaft member is integrally formed from a synthetic resin, even when the sleeve is brought into contact with the shaft member at the time of starting or stopping, wear of the sleeve is small.

DESCRIPTION OF THE PREFERRED EMBODIMENTS

Embodiments of the present invention will be described with reference to the drawings. The devices of the embodiments are applied to a scanner unit for irradiating a laser beam to an object by a reflector fixed to a rotating body.

Figure 1:
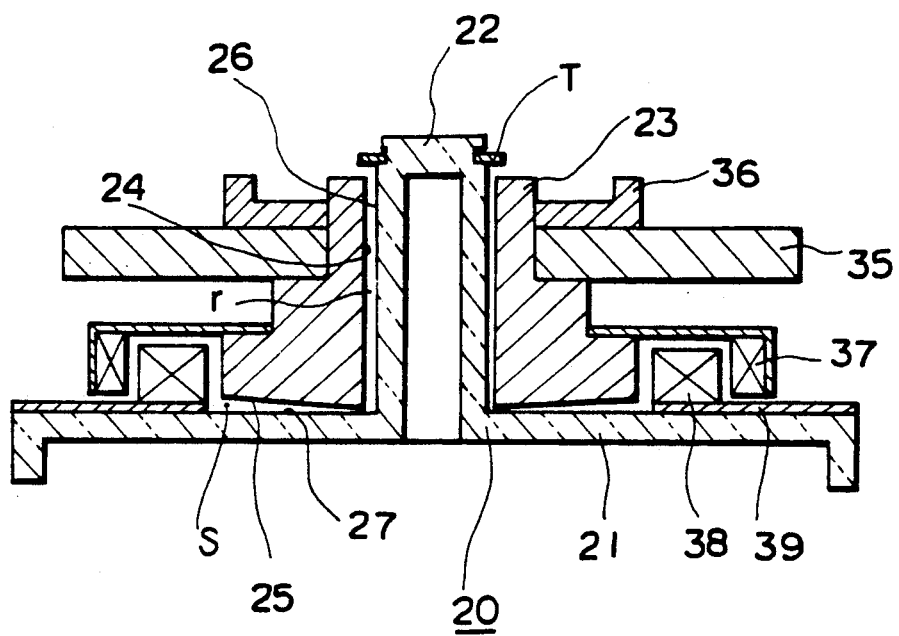
FIG. 1 is a sectional view of a main part of a first embodiment of the present invention.

FIG. 1 shows a first embodiment of the present invention. A shaft member 20 includes a base portion 21 and a shaft portion 22 which extends upright from the base portion 21. The base portion 21 and the shaft portion 22 are integrally molded from a synthetic resin. A sleeve 23 is rotatably fitted about the shaft member 20 with a minute radial gap r formed between the shaft member 20 and the sleeve 23. The sleeve 23 has a cylindrical radial bearing surface 24 formed on an inner peripheral surface, and at the same time, has a thrust bearing surface 25 formed on a lower end surface. The thrust bearing surface 25 is formed in a convex conical shape which is tapered from the inside towards the outside. A snap ring stopper T is attached to an outer peripheral surface of an upper end of the shaft portion 22 to prevent the sleeve 23 from slipping out of the shaft portion 22 during transportation.

The shaft portion 22 of the shaft member 20 to which the sleeve 23 is fitted has a radial receiving surface 26 formed on an outer peripheral surface so that the radial receiving surface 26 opposes the radial bearing surface 24. Furthermore, a flat thrust receiving surface 27 is formed on an upper surface of the base portion 21 so that the thrust receiving surface 27 opposes the thrust bearing surface 25.

Accordingly, a thrust bearing gap S formed between the opposing thrust bearing surface 25 and the thrust receiving surface 27 is gradually enlarged from the lower inner peripheral edge of the sleeve 23 towards the lower outer peripheral edge of the sleeve 23. Thus, an interval or spacing between both of the surface 25 and 27 increases from the inside outwardly and radially.

The radial receiving surface 26 of the shaft portion 22 has herringbone grooves (not shown) formed respectively at axial end portions for generating a dynamic pressure. The pattern of the herringbone grooves may be of the shape of a chevron, or an opentop chevron.

While in this embodiment the grooves are formed in the radial receiving surface 26 of the shaft portion 22, the positions of the grooves are not limited to this location, and the grooves may be formed in the radial bearing surface 24 of the sleeve 23, or in both of the radial bearing surface 24 and the radial receiving surface 26.

On the other hand, a groove (not shown) for generating a dynamic pressure for thrust bearing is formed in at least on of the thrust bearing surface 25 and the thrust receiving surface 27 by a plastic processing, such as an etching work, or the like. This groove has a herringbone shape or a spiral shape.

Since the thrust bearing surface 25 is formed on the lower end surface of the sleeve 23, there is no need to form a groove for thrust bearing in the shaft portion 22.

A plastic material for forming the shaft member 20 is not limited to any particular material so long as the slidability is good. However, for example, when a plastic of polyphenylene sulfide resin containing 15 to 30 wt % carbon fiber, 10 to 20 wt % polytetrafuluoroethylene resin (hereinafter, referred to as PTFE), and 1 to 5 wt % silicone oil, excellent slidability is obtained and this resin is preferable. Furthermore, when a plastic of polyphenylenesulfide resin containing 1 to 15 wt % perfluoropolyether oil or chlorofluoropolyether oil in place of the 1 to 5 wt % silicone oil in the above-mentioned composition is used, it is possible to obtain a shaft member which has an excellent durability with further reduced wear, and which also has a small frictional torque.

In order to increase the accuracy of the radial receiving surface 26 and the thrust receiving surface 27 of the shaft member 20, the cutting work of these surfaces are performed after the shaft member 20 is integrally molded.

Furthermore, in this embodiment, the shaft member 20 if formed in a hollow shape except for the upper end of the shaft portion 22. Also, the whole thickness of the shaft member 20 is made uniform as far as possible including the base portion 21. The reason for this is that when the thickness is varied, including a thick wall portion, a gas pocket is apt to be formed at the time of molding and it is necessary to take steps to prevent this occurrence. Further, a uniform thickness enables the cost of the molding material to be reduced. The whole of the shaft portion 22 may also be formed in a hollow shape without closing the upper end of the shaft portion 22.

As a material for the sleeve 23, an aluminum alloy containing a carbon fiber is used in order to improve the wear resistance property and to reduce weight. For example, this material contains 9 to 16 wt % silicon, 1 to 4 wt % copper, 1 to 3 wt % magnesium, 1 to 5 wt % iron, 1 to 10 wt % carbon fiber, and the rest aluminum. The use of the aluminum alloy provides an advantage in which machining is easy since it is softer than steel.

When the carbon fiber is less than 1 wt %, the slidability is lowered. Conversely, when the carbon fiber is more than 10 wt %, irregularities or a rugged surface is apt to be formed on a rolled surface in the case in which a groove for generating a dynamic pressure is formed in the inner peripheral surface of the sleeve 23 by a rolling method because the carbon fiber is harder than the aluminum, and the amount of plastic deformation is different between the carbon fiber and the aluminum.

However, the carbon fiber may be reduced to less than 1 wt %, when the slidability is not so important, and the carbon fiber may be increased more than 10 wt %, when the groove for generating a dynamic pressure is formed by another method other than by a rolling method.

In FIG. 1, reference numeral 35 denotes a polygon mirror which is secured to an outer surface of the sleeve 23 together with a balance ring 36. Further, a rotor 37 is secured to a step portion of the outer surface of the sleeve 23, and a stator 38 radially facing the rotor 37 is fixed to the base portion 21 through a base plate 39.

Next, the structural merits of the present invention will be described.

First, since the thrust bearing gap S increases gradually from the inside towards the outside, no step portion is formed on the thrust bearing surface 25 and the thrust receiving surface 27. As a result, there is no limitation in forming the groove for generating a dynamic pressure for the thrust bearing, and the groove can be formed efficiently.

Since the base portion 21 and the shaft portion 22 are formed as a unitary mold product of a synthetic resin having good slidability, even when the radial receiving surface 26 and the thrust receiving surface 27 are brought into contact with the radial bearing surface 24 and the thrust bearing surface 25 of the sleeve 23 at the time of starting and stopping rotation, it is still possible to prevent wear and to obtain excellent durability and long service life. In addition, since the base and the shaft are not separate bodies, the assembling work is easy, the manufacturing is easy and the cost is low.

Furthermore, since an aluminum alloy is used as a material of the sleeve 23 which is a rotating member, a reduction in weight is achieved, and the time required for rise to a desired rotational speed becomes short, and a dynamic pressure bearing device with small starting torque is obtained. In particular, in the device of this embodiment, since the aluminum alloy containing carbon fibers used for the sleeve 23, a device having an excellent slidability and small starting torque can be achieved.

In addition, since the aluminum alloy is softer than steel and easier to work, it is possible to form the groove for generating dynamic pressure of a herringbone shape or the like in the radial bearing surface 24 of the inner peripheral surface of the sleeve 23 by a rolling method. Thus, mass production becomes easy. Also, it is easy to work the thrust bearing surface 25 in the shape of a convex conical surface.

Next, the operation of the dynamic pressure bearing device will be described.

First, under a condition in which the device is stopping, the sleeve 23 is lowered and is riding on the base portion 21. However, since the thrust bearing surface 25 is formed in a tapered shape, only the lower inner edge of the sleeve 23 which is protruding downwardly the most is brought into line-contact with the thrust receiving surface 27 of the base portion 21. Thus, a contact area is maintained at a minimum.

Under this condition, when the coil of the stator 38 is energized, a rotation force is generated in the rotor 37, and the sleeve 23 starts rotation. At the time of this starting of rotation, since the contact area between the thrust bearing surface 25 and the thrust receiving surface 27 is small, the starting torque is very small, and the rise of rotation to a desired speed is fast. Further, since no wear dust intrudes at the time of starting and stopping into the space between the rotating surface and the stationary surface of the device, the durability of the device is also improved.

When the sleeve 23 starts rotation, the pressure of air within the radial bearing gap r becomes high due to a pumping action of the groove or the herringbone shape for generating dynamic pressure, which is formed in the radial bearing portion, and the sleeve 23 is supported radially with respect to the shaft portion 22 without contacting the shaft portion 22. As a result, the radial load capacity of the radial bearing portion is increased.

At the same time, the pressure of air within the thrust bearing gap S becomes high due to a pumping action of the groove for generating dynamic pressure, which is formed in the thrust bearing portion, and the sleeve 23 is supported and lifted axially with respect to the base portion 21 without contacting the base portion 21. As a result, the thrust load capacity of the thrust bearing portion is increased.

The polygon mirror 35 reflects a laser beam emitted from a semiconductor laser (not shown) or the like by changing an angle, and an object, such as a photo-sensitive drum, is illuminated by the laser beam.

In the operation described above, since the thrust receiving surface 27 is in line-contact with the thrust bearing surface 25, the static friction is small, and thus, the starting torque can be reduced. Furthermore, the intrusion of wear dust into the space between the surfaces 25 and 27 is prevented, and the friction therebetween is reduced and the durability is improved.

While in the embodiment described above, the thrust bearing gap S which increases outwardly from the inside is formed by making the thrust bearing surface in the shape of a tapered conical surface, the formation of the thrust bearing gap S is not limited to this shape, and it may be formed by making the thrust receiving surface 27 in the shape of a convex conical surface. Furthermore, the curvature of these surfaces 25 and 27 may be selected arbitrarily and, for example, a convex spherical shape may be employed.

Furthermore, in the above embodiment, the groove for generating dynamic pressure is formed in the radial receiving surface 26 of the shaft portion 22. However, it may, of course, be formed in the radial bearing surface 24 of the sleeve 23. Furthermore, the herringbone-shaped grooves formed on at least one of the radial bearing surface 24 and the radial receiving surface 26 may be formed at three or more positions, or at one position instead of two axial positions.

Figure 2:
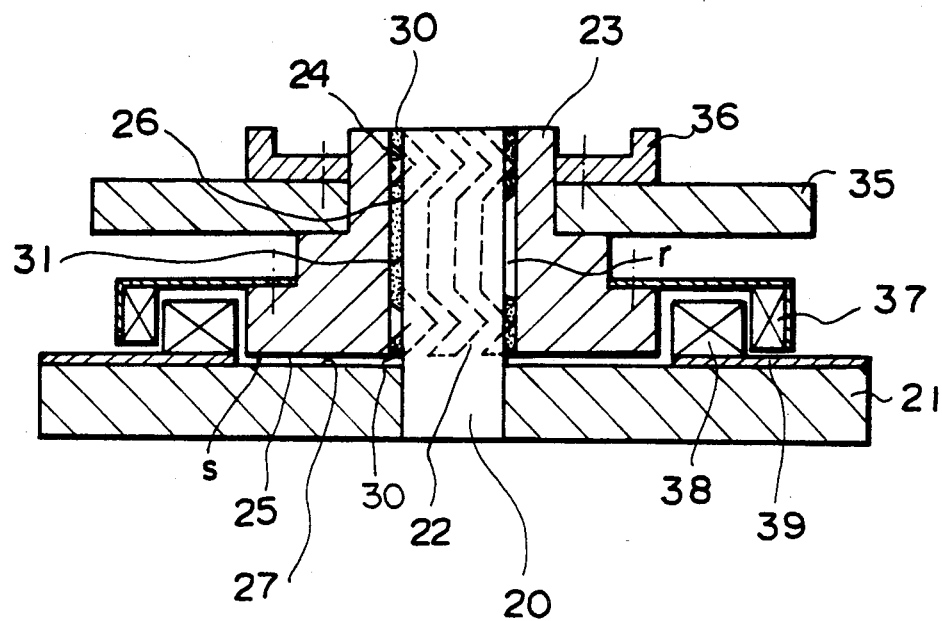
FIG. 2 is a sectional view of a main part of a second embodiment of the present invention.

FIG. 2 shows a second embodiment of the present invention.

The grooves for generating dynamic pressure of the radial bearing portion are composed of herringbone-shaped grooves 30 having a chevron pattern formed in upper and lower portions of the radial bearing surface 24 of the sleeve 23 and a linear groove 31 is formed in an intermediate portion to connect the upper and lower herringbone grooves 30 in an axial direction.

In forming the grooves for generating dynamic pressure in the radial bearing surface 24 as described above, a ball rolling work can be used, and it is preferable to utilize a working device for a dynamic pressure generating groove disclosed in Japanese Patent Laid-Open Application No. 63-230218 for this purpose.

The working device performs a plastic working to form a groove for generating dynamic pressure in an inner peripheral surface of the sleeve of the dynamic pressure bearing device. A cylindrical shaft of the working device has a through hole formed in one shaft end in an orthogonal direction with respect to the shaft. An inner peripheral surface of the through hole is a cylindrical surface and its axis line passes through the center of the shaft. The direction of the axis line is orthogonal to a longitudinal center line of the shaft.

In this through hole, there are inserted, for example, three balls of the same diameter in one row so that the balls are rollable. These balls are harder than the sleeve to be worked, and it is designed that a diameter of a circle including the plurality of balls which contact the sleeve to be worked is made larger than an inner diameter of the sleeve to be worked.

The shaft structured as described above is rotated at a predetermined rotational speed and is fed at a predetermined feed speed into the inner peripheral surface of the sleeve to be worked which is stationarily fixed in position. Supposing when the sleeve to be worked is the sleeve 23, for example, the shaft is rotated in a counter-clockwise direction and is inserted from the lower end of the sleeve 23. After the shaft is fed for a certain distance, the rotation of the shaft is reversed and further fed to advance the same distance. As a result of this, the balls of the shaft are pressed against the sleeve 23 and a herringbone-shaped groove of a chevron pattern is formed in the inner peripheral surface of the sleeve 23. Subsequently, the shaft is fed forwardly while the rotation is stopped. When the shaft reaches the other end of the sleeve 23, the shaft is fed again while being rotated in the counterclockwise direction, and after the shaft is fed for a certain distance, the rotation of the shaft is reversed and further fed to advance the same distance. As a result, a herringbone-shaped groove of a chevron pattern is formed in the inner peripheral surface of the other end of the sleeve 23.

In this manner, the grooves 30 for generating dynamic pressure having patterns connected in the axial direction are easily formed in the radial bearing surface 24 which is the inner surface of the sleeve 23.

In this embodiment, a snap ring stopper is not fixed to the outer peripheral surface of the upper end of the shaft portion 22.

Figure 3:
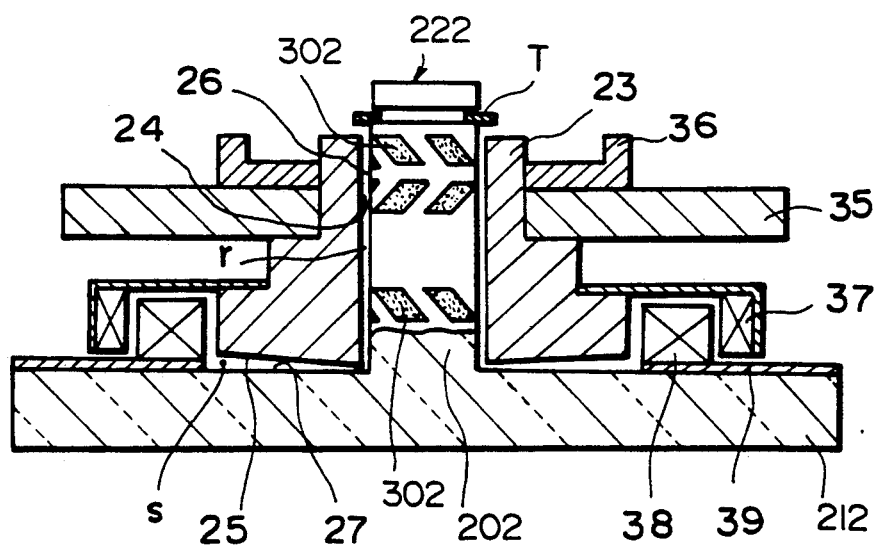
FIG. 3 is a sectional view of a main part of a third embodiment of the present invention.

FIG. 3 shows a third embodiment of the present invention.

Grooves 302 for generating dynamic pressure having an open-topped chevron-like, herringbone shape are formed in a radial receiving surface 26 at two axially spaced positions. A shaft member 202 having a shaft portion 222 and a base portion 212 is a solid body having no hollow portion. Thus, the shaft portion 222 is solid.

In each of the embodiments described above, a radially and horizontally opposing type driving motor is used, in which the rotor 37 and the stator 38 are radially and horizontally opposed to each other. Because, in this type of driving motor, an axial load due to the attraction of the motor can be reduce, this type of driving motor is advantageous in the point of a load capacity of the thrust bearing as compared with a plane opposing type. However, the plane opposing type motor may also be used.

Furthermore, in all of the embodiments, one example of mounting the polygon mirror 35 on the sleeve 23 is described. However, a magnetic disk, an optical disk, or hologram disk may be mounted on the sleeve 23. Alternately, an upper cylinder of a magnetic head cylinder of a video tap recorder, a digital audio tape recorder, or the like may be mounted on the sleeve 23. In the case of the magnetic head cylinder, instead of mounting the upper cylinder on the sleeve 23, the sleeve 23 and the upper cylinder may be formed as a unitary structure.

As described in the foregoing, in the present invention, in the device having the radial bearing portion and the thrust bearing portion, the radial load capacity and the thrust load capacity are provided.

Furthermore, since the thrust bearing gap increases gradually from the inside towards the outside, the static friction is small. Therefore, a small starting torque is needed, and the rise of rotation to a desired speed can be made fast. Also, since the wear dust generated at the time of starting and stopping of rotation is prevented from entering the gap between the rotating member and the static member, friction between these members can be reduced.

Moreover, since no step portion is created between the thrust bearing surface and the thrust receiving surface, even when one of the surfaces is inclined, the outer portion of the inclined surface is never brought into abutment with the other surface. As a result, a dynamic pressure bearing having an excellent durability can be provided.

Furthermore, in the device wherein the sleeve is formed by a material composed of an aluminum alloy containing a carbon fiber, the cutting work of the sleeve and the working to form the groove in the inner peripheral surface become easy. At the same time, the sleeve becomes light in weight, the starting torque is small, and the rise of rotation to a desired speed is fast. Also, since the slidability of the radial bearing surface and the thrust bearing surface is excellent, it is possible to reduce the wear of the device.

Furthermore, in the device wherein the base portion and the shaft portion of the shaft member are integrally formed, the assembling work of the shaft member can be omitted, and the manufacturing cost can, thus, be reduced.

Furthermore, in the device wherein the base portion and the shaft portion of the shaft member are integrally molded from a synthetic resin, the wear of the bearing surface and the receiving surface is prevented, and a device having an excellent durability and suitable for mass-production can be provided.

What is claimed is:

1. A dynamic pressure bearing device comprising:
   a sleeve having a cylindrical radial bearing surface formed in an inner peripheral surface and a thrust bearing surface formed at one end surface;
   a shaft member fitted into said sleeve and having a radial receiving surface opposing the radial bearing surface and a thrust receiving surface opposing the thrust bearing surface;
   a first groove for generating a dynamic pressure formed in at least one of the radial bearing surface and the radial receiving surface;
   a second groove for generating a dynamic pressure formed in at least one of the thrust bearing surface and the thrust receiving surface; and
   a thrust bearing gap formed between the thrust bearing surface and the thrust receiving surface, said thrust bearing gap increasing gradually radially and outwardly.

2. The dynamic pressure bearing device according to claim 1 wherein said shaft member includes a base portion and a shaft portion, the shaft portion extending upright from the base portion and integrally formed with the base portion, the shaft portion having the radial receiving surface formed thereon, the base portion having the thrust receiving surface formed on an upper surface thereof.

3. The dynamic pressure bearing device according to claim 2 wherein said base portion and said shaft portion of said shaft member are integrally formed from a synthetic resin.

4. A dynamic pressure bearing device comprising:
   a sleeve having a cylindrical radial bearing surface formed in an inner peripheral surface and a thrust bearing surface formed at one end surface;
   said sleeve being formed from an aluminum alloy containing a carbon fiber;
   a shaft member fitted into said sleeve and having a radial receiving surface opposing the radial bearing surface and a thrust receiving surface opposing the thrust bearing surface;
   a first groove for generating a dynamic pressure formed in at least one of the radial bearing surface and the radial receiving surface; and
   a second groove for generating a dynamic pressure formed in at least one of the thrust bearing surface and the thrust receiving surface.

5. The dynamic pressure bearing device according to claim 4 wherein said shaft member includes a base portion and a shaft portion, the shaft portion extending upright from the base portion and integrally formed with the base portion, the shaft portion having the radial receiving surface formed thereon, the base portion having the thrust receiving surface formed on an upper surface thereof.

6. The dynamic pressure bearing device according to claim 5 wherein said base portion and said shaft portion of said shaft member are integrally formed from a synthetic resin.

* * * * *